United States Patent [19]

Krause et al.

[11] 3,951,390
[45] Apr. 20, 1976

[54] THRUST BEARING DEVICE FOR METAL TREATING VESSEL

[75] Inventors: Richard P. Krause; Harry T. Montgomery, both of New Castle, Pa.

[73] Assignee: Pennsylvania Engineering Corporation, Pittsburgh, Pa.

[22] Filed: Apr. 3, 1974

[21] Appl. No.: 457,437

[52] U.S. Cl. .............................. 266/221; 266/244; 308/72; 266/246
[51] Int. Cl.² .......................................... C21C 5/46
[58] Field of Search ............. 266/36 P, 35; 308/163, 308/29, 72, 140, 141

[56] References Cited
UNITED STATES PATENTS

| | | | |
|---|---|---|---|
| 2,045,030 | 6/1936 | Thompson | 308/72 |
| 2,976,090 | 3/1961 | McFeathers | 266/36 P X |
| 3,291,541 | 12/1966 | Dellinger | 266/36 P |
| 3,311,427 | 3/1967 | Toth et al. | 266/36 P |
| 3,395,951 | 8/1968 | Barr et al. | 308/72 |
| 3,503,599 | 3/1970 | Jansa et al. | 266/36 P |
| 3,746,328 | 7/1973 | Martt | 266/36 P |
| 3,810,297 | 5/1974 | Fisher | 266/36 P X |
| 3,893,735 | 7/1975 | Brenner | 308/72 X |
| 3,897,120 | 7/1975 | Riegler et al. | 308/72 X |
| 3,897,121 | 7/1975 | Riegler et al. | 308/72 X |

Primary Examiner—Roy Lake
Assistant Examiner—Paul A. Bell
Attorney, Agent, or Firm—Fred Wiviott

[57] ABSTRACT

A converter 10 having horizontally exiting trunnion pins which are subject to side loading. A pair of bearings support the trunnion pins for rotation and a thrust bearing assembly is connected to the terminal end of one of the trunnion pins and is mounted independently of the pair of bearings. The thrust bearing is mounted for movement in a circular path about the axis of the one trunnion pin to permit misalignment thereof.

10 Claims, 6 Drawing Figures

THRUST BEARING DEVICE FOR METAL TREATING VESSEL

BACKGROUND OF THE INVENTION

Refractory lined converter vessels used in either top or bottom blown oxygen refining processes generally include horizontally extending trunnion pins which are supported in bearings for being tilted by a motor driven bull gear so that the vessel may be tilted for charging and tilting. The trunnion pins are coupled to the vessel by means of a trunnion ring which surrounds the vessel. It will be appreciated that the vessel and trunnion ring are subject to intense heat and accordingly must be free to expand and contract along the trunnion bearing axis. In one prior art vessel support, idler side trunnion support bearing is constructed and arranged to permit such expansion while the trunnion support bearing on the drive side of the furnace is fixed. For example, the bearings may be of the spherical, self-aligning double row type capable of accepting both radial and thrust loads. One of the bearings is of the fixed type which is clamped to its respective trunnion pin while the other includes a float feature which may comprise roller bearings of the ladder type. Such combinations of bearings have been found to be adequate for use with vessels having a top lance for oxygen injection but are not satisfactory for bottom blown vessels wherein oxygen is injected through submerged tuyeres because of greater axial loading. This results from the swirling action of the metal bath in the converter caused by blowing oxygen through submerged tuyeres which causes a thrust reaction along the axis of the trunnion shaft and a rocking action about the axis of the trunnion bearing. Such thrust forces are absorbed by the fixed trunnion bearing and are transmitted down through the bearing housing, support piers, and into the foundation supporting the entire vessel. Further, the thrust and rocking forces are cyclical and produce an alternating hammering or rhythmic effect on the fixed bearing which in time can Brinell the bearing races and rollers, loosen the foundation bolts and ultimately damage the bearing support piers.

SUMMARY OF THE INVENTION

It is a primary object of the invention to provide metallurgical vessel having a thrust bearing capable of absorbing both radial and axial loads.

It is another object of the invention to provide a thrust bearing device which may be employed with steel converter vessels to decrease the wear and increase the durability of the trunnion support bearings and converter drive systems.

It is yet another object of the invention to provide a thrust bearing which may readily be adapted to existing steel converters.

It is a further object of the invention to provide a thrust bearing which may accept the thrust and radial forces encountered in bottom blown oxygen refining processes.

It is another object of the invention to provide an expansion accommodating and self-adjusting thrust bearing device which can be used in association with the trunnion pin on either side of a converter vessel trunnion ring.

How these and other more specific objects of the invention are achieved will become apparent from the following detailed description of several preferred embodiments thereof taken in conjunction with the drawings. In general terms, however, the invention comprises a metallurgical vessel having oppositely extending trunnion pins or extensions thereof which are journaled for rotation in bearings adapted for radial loading and having a third bearing coupled to one trunnion pin for absorbing thrust loading and which is movable about a spherical surface to permit axial misalignment of the pins.

DESCRIPTION OF A PREFERRED EMBODIMENT

Figure 1:
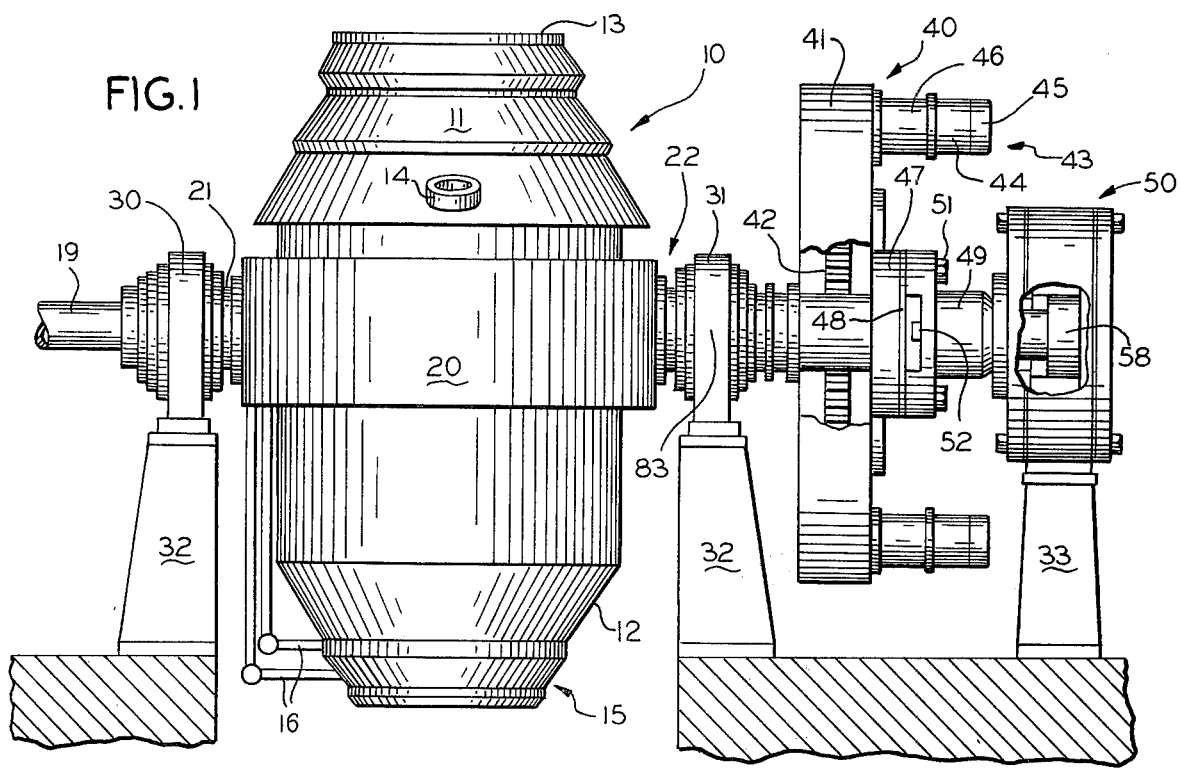
FIG. 1 is a side elevation view with parts broken away of a converter vessel and its associated support drive systems and including one thrust bearing device according to the present invention.

FIG. 1 illustrates a metallurgical converter vessel 10 supported in a trunnion ring 20. Converter 10 and ring 20 are supported for tilting jointly on diametrically spaced apart substantially coaxial trunnion pins 21 ad 22 which are journaled in trunnion support bearings 30 and 31. After passing through trunnion support bearing 31, trunnion pin 22 is connected to a conventional drive system, indicated generally by the number 40, which is in turn connected to the new thrust bearing assembly 50 according to the present invention.

The converter vessel 10 is a refractory lined vessel having a cylindrical body and generally converging upper portion 11 and lower portion 12. The converter vessel 10 has a mouth 13 through which it is charged with the hot metal and scrap. A pouring spout 14 is provided at the upper portion 11 for pouring slag or refined metal. In this embodiment of the invention, the lower portion 15 of converter 10 has a tuyere system not shown for injecting process gases and finely divided solids into the melt within the vessel. The tuyeres may include concentric passageways which are supplied by means of pipes 16 in a manner well known to the art. For present purposes it is sufficient to recognize that bottom assembly 15 includes various gas and material distribution headers which are coupled to concentrically arranged tuyere pipes. The gases and particulate material permeate the molten metal within the vessel 10 and cause the desired chemical reactions therein. Feed pipes 16 lead back to a passageway (not shown) in trunnion ring 20. The passageway continues through trunnion pin 21 and is connected to a conduit 19 through a rotary joint (not shown) so the vessel may tilt while conduit 19 remains stationary. Conduit 19 connects with supply storage means (not shown) for the gases and particulate materials. Trunnion ring 20 surrounds converter 10 and is connected thereto in a conventional manner by circumferentially spaced supports (not shown). Those skilled in the art will appreciate that a substantial annular space (not shown) exists between trunnion ring 20 and converter 10 to allow for radial expansion of the converter due to thermal changes of the system during metal processing.

Trunnion pins 21 and 22 are cylindrical and respectively pass through bearings 30 and 31 which are mounted on concrete or concrete and steel support piers 32. Those skilled in the art will appreciate that any suitable bearings, such as spherical, self-aligning double-row roller bearings may be employed with the inner races (not shown) of each bearing being attached to the respective trunnion pins 21 or 22 and the outer races attached to the outer support of each bearing in a manner not shown. Bearings 30 and 31 are free to expand or contract along the trunnion pin axes on linear, ladder-type bearings or other suitable journaling and linear expansion means (not shown). The interior construction of bearings 30 and 31 has not been described in detail since such bearings are well known in the art as being useful for idler pin support. The present invention is concerned, among other things, with enabling use of identical support bearings on both sides of converter 10.

As shown in FIG. 1, trunnion pin 22 extends through trunnion bearing 31 and is connected to the drive system 40 for tilting converter 10 about a horizontal trunnion axis. Drive system 40 may include a generally cylindrical housing 41 surrounding a bull gear 42 which is fastened to trunnion pin 22. Housing 41 is anchored by resilient means, not shown, to prevent its rotation and is journaled on pin 22 so the pin 22 may rotate while the housing 41 remains stationary. A plurality of motor means 43 for turning bull gear 42 may be circumferentially arranged on the exterior surface of housing 41 which is remote from the converter 10. In the illustrated figure two motor means 43 are shown, although in actual practice as many as six or more may be employed. Motor means 43 in the illustrated embodiment may include an electric motor 44 equipped with a brake 45. Attached to the shaft of motor 44 is a pinion (not shown) which engages a speed reducer gear transmission 46 which in turn has a pinion for engaging bull gear 42. Due to the large diameter differences between the pinion of the speed reducer gear transmission 46 and bull gear 42, this arrangement allows for extremely slow start-up and tilting of the converter vessel and reduces the strain on the bearing (not shown) within the drive unit 40.

Although electric motors 44 are shown in FIG. 1, hydraulic motors may also be employed. For a more complete description of converter vessel drive systems and torsion restraints, reference is made to U.S. Pat. No. 3,771,777 "Converter Vessel Drive Using Hydraulic Motors" filed Dec. 29, 1971.

The thrust bearing assembly 50 according to the preferred embodiment of the invention may be coupled to the trunnion pin 22 by an adapter assembly 47 which includes an adapter plate 48 suitably bolted to the trunnion pin 22 and an adapter hub 49 secured to bull gear 42 by bolts 51 which also pass through plate 48. The adapter hub 49 has an axial bore 52 for receiving one end of a shaft member 53 which extends into bearing assembly 50 and has an enlarged diameter annular head portion 54 at its other end. Axially extending bolts 55 affix the one end of shaft 53 to the adapter hub 49.

Figure 2:
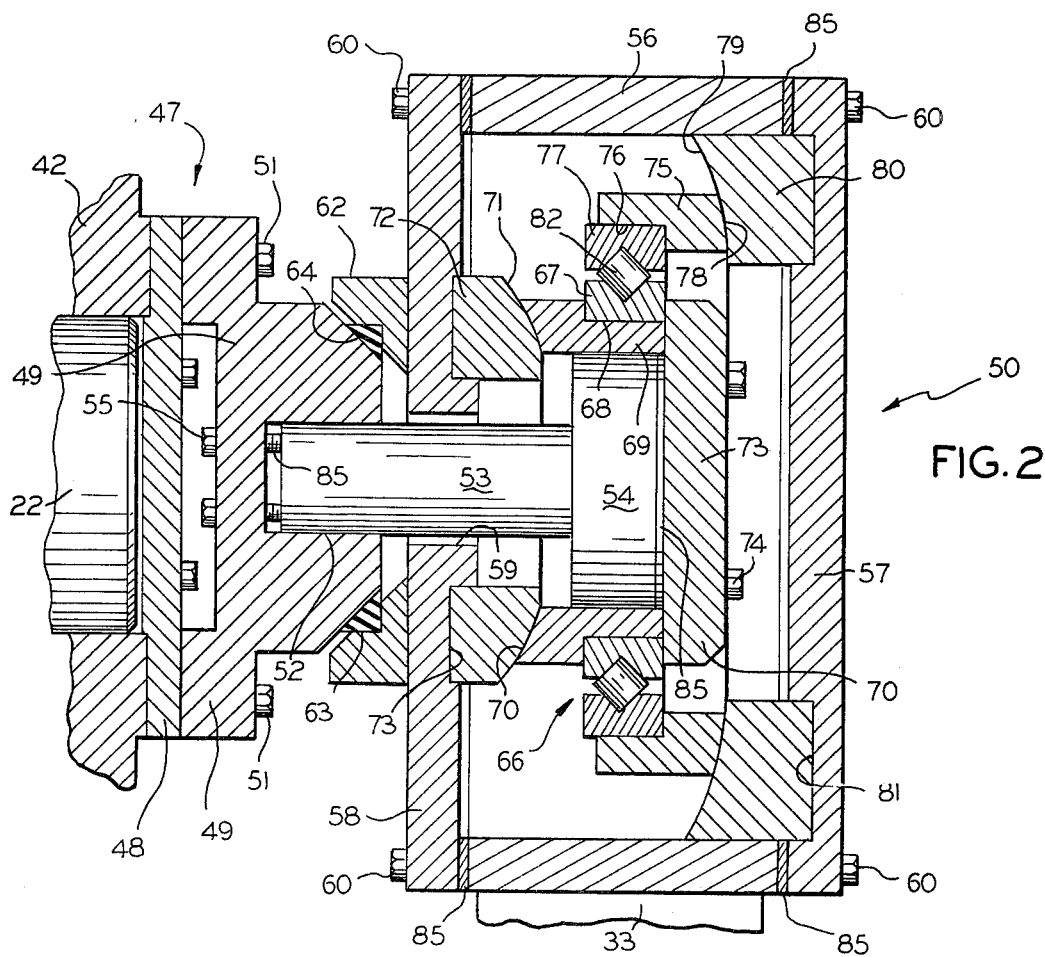
FIG. 2 is an enlarged side elevation view partially in section of the thrust bearing device shown in FIG. 1.

As seen in FIGS. 1 and 2, the bearing assembly 50 may include a generally cylindrical outer housing 56 which may be supported on a pier 33 which may be similar to the piers 32 which support bearings 30 and 31. Housing 56 is disposed in a coaxial relation to shaft 53 and its opposite ends are defined by circular coaxial outer and inner face plates 57 and 58 respectively, the latter of which has an axial opening 59 through which the shaft 53 extends to position head portion 54 intermediate said plates. The plates 57 may be suitably affixed to housing 56 such as by bolts 60.

Those skilled in the art will appreciate that the housing 56 is preferably filled with a suitable lubricant and in that event a seal is provided in surrounding relation to the opening 59. In the preferred embodiment shown in FIG. 2, the seal takes the form of an annular ring 62 affixed to the outer surface of plate 58 coaxially relative to opening 59 and a gasket member 63 supported in ring 62 and engaging a conical surface 63 formed on hub member 49.

The bearing 50 includes an annular thrust bearing 66 having an inner race 67 which is received in a suitable recess 68 formed in the outer surface of a retainer ring 69 suitably affixed, such as by welding to the outer periphery of head 54 of shaft 53. Retainer ring 69 also has a spherical concave end surface to which engages a corresponding convex spherical surface 71 formed on an annular, coaxial rocker block 72 received within a recess 73 formed on the inner surface of end plate 58. The bearing 66, the retainer ring 69 and the rocker block 72 are held in position by means of a retainer plate 73 releasably secured to the end of shaft 53 head portion 54, such as by bolts 74. A second annular retainer ring 75 having a suitably formed annular recess 76 which engages the outer race 77 of bearing 66 and which in turn has a convex spherical end surface 78 engaged by a corresponding concave spherical surface 79 formed on a second rocker block 80. The end plate 57 also has an annular recess 81 for receiving rocker block 80 whereby plate 57 serves to hold rocker block 80 and retainer ring 75 in position.

The thrust bearings 66 may be any well known bearing type capable of sustaining the thrust load. For example, bearing 66 may be a Messenger Type X thrust bearing having spherical rollers 82 between races 67 and 77.

It will be appreciated that as a result of bending in the trunnion structure under load in addition to other factors, the trunnion pins 21 and 22 do not rotate about a true axis. Since the in race 67 of bearing 66 is rigidly affixed to the end of trunnion pin 22, the bearing assembly 50 preferably accommodates misalignment of trunnion pin 22 and shaft 53. Toward this end, the mating surfaces 70 and 78 of retainer rings 69 and 75 and 71 and 79 of rocker blocks 72 and 80 are spherical and preferably have a common center of curvature at the center of the trunnion pin bearing 31 symbolized by reference numeral 83 in FIG. 1. As trunnion pin 22 and shaft 53 rotate, there is an accompanying movement of the thrust bearing 66 in a spherical path with point 83 at its center as the retainer rings 69 and 75 slide on rocker blocks 72 and 80.

In order to insure a snug fit between the various elements of the thrust bearing 50, shim plates or shim packs 85 may be provided between housing 56 and the face plates 57 and 58 and between the retainer plate 73 and the head 54 of shaft 53. The shim packs 85 enable the correct setting of the bearing thrust preload and also the pressure on the bearings and the races.

Figure 3:
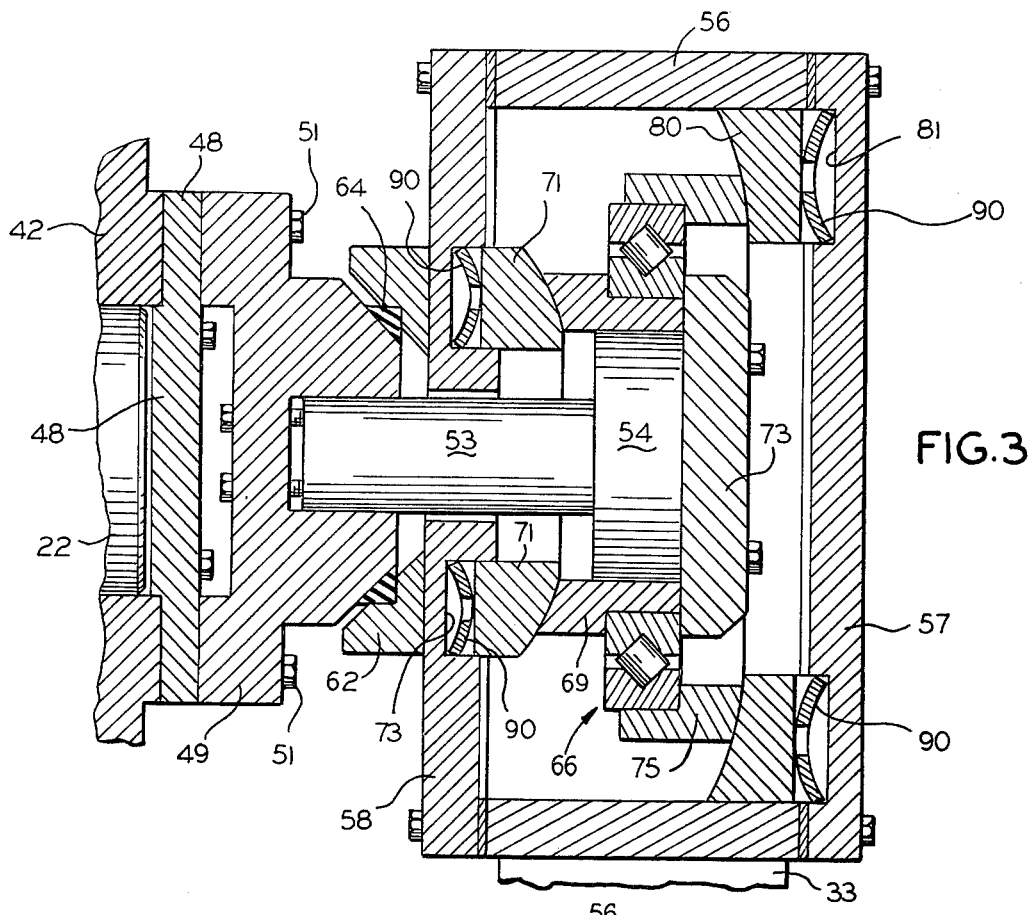
FIG. 3 is an enlarged side elevation view partially in section of an alternate embodiment of the thrust bearing device.

An alternate embodiment of a thrust bearing assembly 50' which may be employed with vessel 10 is shown in FIG. 3 and is substantially the same as the bearing assembly 50 shown in FIG. 2 except that spring means 90 are disposed in the recesses 81 and 73 formed in plates 57 and 58 and behind the respective rocker blocks 80 and 72. Springs 90 may be of the Belleville type and serve to absorb thrust shock and serve to cushion impact on the thrust bearing 66, the housing stand 56 and the support 32. It will be appreciated that the springs 90 may take other forms such as coil springs or shock absorbing devices.

Figure 4:
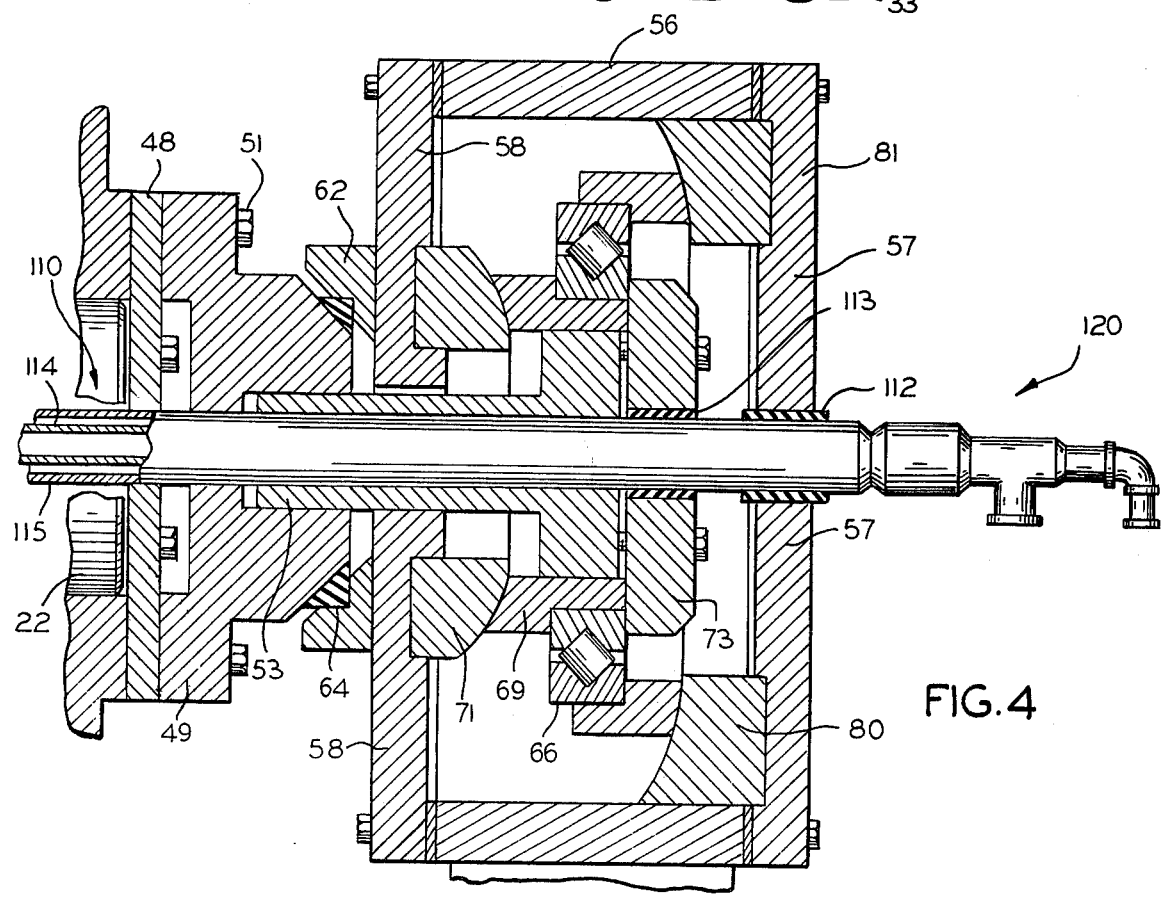
FIG. 4 is a view similar to that shown in FIG. 2 except that the thrust bearing device is provided with an axial conduit.

FIG. 4 illustrates how process or cooling fluids may be delivered to vessel 10 through the bearing assembly 50 according to the invention. For example, an axially extending conduit 110 passes through hub 49, plate 48, shaft 53, plate 73 and end plate 57. To prevent leakage of lubricant from housing 50, a suitable seal 112 and 113 may be provided in surrounding relation to conduit 110 at the openings through the plates 57 and 73. Conduit 110 may include concentrically disposed inner and outer conduits 114 and 115 thereby providing passageways for the delivery of two fluids. As stated hereinbefore, these passageways may be used to supply various processing gases and solids to converter 10 and may be used in conjunction with pipes 19 and 16 shown in FIG. 1 or may be used to supply alternate piping. It will be understood that a rotary joint may be provided at the outer end of conduit 110 to permit the bearing assembly to rotate while the conduit is supplied from stationary piping.

Figure 5:
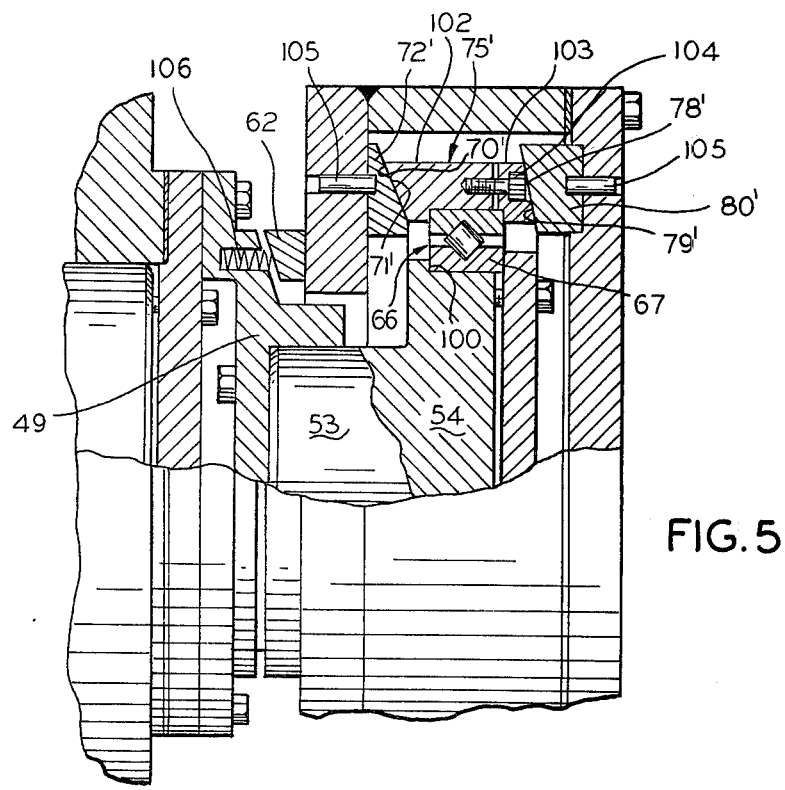
FIGS. 5 and 6 show alternate embodiments of the invention.

The embodiment of the invention shown in FIG. 5 differs from that shown in FIG. 2 in that the inner race 67 of bearing 66 is mounted in a recess 100 formed in the head 54 of shaft 53. This embodiment also differs in that the outer race support 75' includes a pair of rings 102 and 103 which are joined by bolts 104. The rocker block 72' is also of increased diameter and its surface 71' is engaged by a spherical surface 70' on the inner end of race support member 102, while the surface 78' on member 103 engages surface 79' on rocker block 80'. The rocker blocks 72' and 80' may be secured against rotation by pins 105. In addition a spring loaded seal 106 is disposed between hub member 49' and ring 62.

Figure 6:
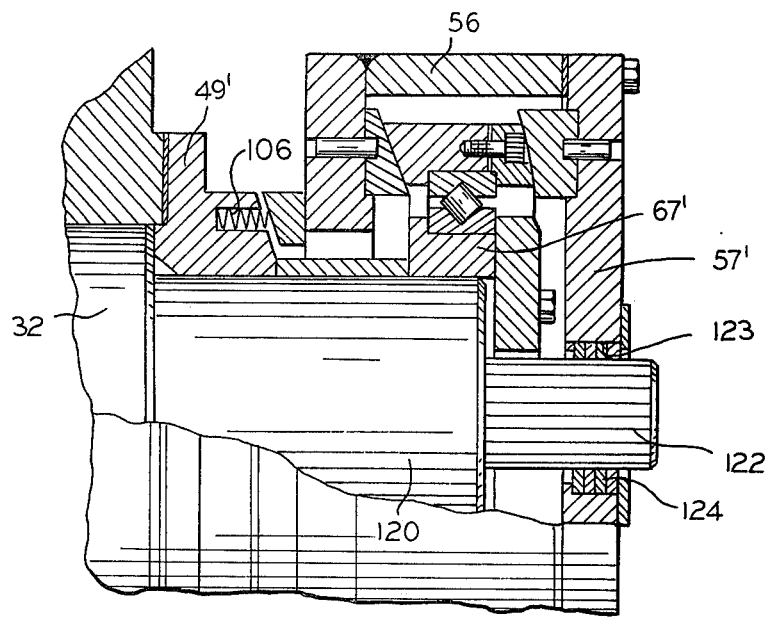

The embodiments of FIGS. 1–5 are constructed and arranged to be employed with existing vessel trunnion pins. FIG. 6 illustrates how the invention may be employed with a modified trunnion pin. More specifically, trunnion pin 32' is shown to be provided with an axial extension 120 which extends through hub and into housing 56 and to which the outer race support 67' is attached. In addition, a second axial extension 122 may also extend through an opening 123 in the rear plate 57' and which is sealed by a resilient packing 124.

We claim:
1. In combination:
a. a vessel for converting ferrous metal to steel,
b. first and second shaft means extending substantially horizontally from said vessel,
c. support means spaced from said vessel and including first and second bearing means in which said first and second shaft means are journaled, respectively, to enable rotation of said vessel to selected angular positions, said bearing means also permitting axial movement of said shaft means,
d. drive means for rotating said vessel and coupled to a first one of said shaft means, and
e. thrust bearing means mounted along the axis of said shaft means independently of said first and second bearing means and being coupled to one of said shaft means for absorbing forces that are substantially axial of said shaft means, said thrust bearing means including second support means, and rocker means coupled between said one shaft means and said second support means to permit the end of said one shaft means to move about a nominal axis of rotation,
f. said rocker means including first and second means mounted on said one shaft means and having spaced apart substantially concentric first and second oppositely curved surfaces,
g. axially spaced apart third and fourth means having, respectively, third and fourth curved surfaces complementary to and in sliding contact relationship with said first and second curved surfaces,
h. said first and second means comprising radially separated elements the first of which has said first curved surface and the second of which has said second curved surface, and
i. bearing means interposed between said first and second radially separated elements.
2. The invention set forth in claim 1 wherein:
a. said last named bearing means has an inner and outer race and bearing elements therebetween, said inner race being engaged with said first radially separated element and said outer race being engaged with said second radially separated element whereby to permit relative rotation of said elements concurrently with their associated first and second curved surfaces sliding on said third and fourth curved surfaces, respectively.
3. The invention set forth in claim 1 including:
a. resilient means positioned for said fourth means to react there against whereby to resiliently absorb forces transmitted from said second curved means.
4. The invention set forth in claim 1 including:
a. stationary housing means into which said shaft means extends and which supports the aforesaid means which have said third and fourth curved surfaces, said resilient means being interposed between said housing means and said fourth means and said resilient means comprising transversely curved spring washer means.
5. In combination:
a. a vessel for converting ferrous metal to steel,
b. first and second shaft means extending substantially horizontally from said vessel,
c. support means spaced from said vessel and including first and second bearing means in which said first and second shaft means are journaled, respectively, to enable rotation of said vessel to selected angular positions, said bearing means also permitting axial movement of said shaft means,
d. drive means for rotating said vessel and coupled to a first one of said shaft means, and
e. thrust bearing means mounted along the axis of said shaft means independently of said first and second bearing means and being coupled to one of said shaft means for absorbing forces that are substantially axial of said shaft means, said thrust bearing means including second support means, and rocker means coupled between said one shaft means and said second support means to permit the end of said one shaft means to move about a nominal axis of rotation,
f. said rocker means including means mounted on said one shaft means and having spaced apart substantially concentric first and second oppositely curved surfaces, g. axially spaced apart third and fourth means having, respectively, third and fourth curved surfaces complementary to and in sliding contact relationship with said first and second curved surfaces, h. said curved surfaces being spherical segments all of which are generated about a point coincident with the axis of said shaft means.

6. In combination:

a. a vessel for converting ferrous metal to steel, b. first and second shaft means extending substantially horizontally from said vessel, c. support means spaced from said vessel and including first and second bearing means in which said first and second shaft means are journaled, respectively, to enable rotation of said vessel to selected angular positions, said bearing means also permitting axial movement of said shaft means, d. drive means for rotating said vessel and coupled to a first one of said shaft means, and e. thrust bearing means mounted along the axis of said shaft means independently of said first and second bearing means and being coupled to one of said shaft means for absorbing forces that are substantially axial of said shaft means, said thrust bearing means including second support means, and rocker means coupled between said one shaft means and said second support means to permit the end of said one shaft means to move about a nominal axis of rotation, f. said rocker means including means mounted on said one shaft means and having spaced apart substantially concentric first and second oppositely curved surfaces, and g. axially spaced apart third and fourth means having, respectively, third and fourth curved surfaces complementary to and in sliding contact relationship with said first and second curved surfaces, h. means supporting said fourth means for limited axial movement, and i. resilient means reacting against said fourth means to cushion axial forces applied to it.

7. In combination:

a. a vessel for converting ferrous metal to steel, b. first and second shaft means extending substantially horizontally from said vessel, c. support means spaced from said vessel including first and second bearing means in which said first and second shaft means are journaled, respectively, to enable rotation of said vessel to selected angular positions, said bearing means also permitting axial movement of said shaft means, d. drive means for rotating said vessel and coupled to a first one of said shaft means, e. thrust bearing means mounted along the axis of said shaft means independently of said first and second bearing means and being coupled to one of said shaft means for absorbing forces that are substantially axial of said shaft means, f. a first member associated with said thrust bearing means and affixed on one of said shaft means for rotation therewith, g. a second stationary member having a first spherical surface, h. bearing means interposed between said first and second members to permit relative rotation between them, said bearing means having means defining a second spherical surface complementary to said first spherical surface and in relative sliding contact relationship therewith.

8. In combination:

a. a metallurgical vessel having tuyeres for injecting process materials into the molten contents of the vessel beneath the surface of said contents, b. one and another shaft means extending horizontally and nominally coaxially from opposite sides of said vessel to enable rotation of said vessel to selected angular positions, c. one and another bearing means in which said one and another shaft means are journaled, respectively, and means for supporting said bearing means, said bearing means supporting the major gravitational forces of said vessel but being substantially yielding to the axially directed thrust forces of said shaft means, d. thrust bearing means for absorbing the axially directed thrust of said shaft means and for compensating any deflection thereof, said thrust bearing means being engaged with said one shaft means remotely from said one bearing means, e. drive means coupled with said one shaft means between said one bearing means and said thrust bearing means, f. said thrust bearing means comprising stationary support means adjacent said one shaft means, g. means rotatable with said one shaft means and having axially spaced apart radially extending curved surfaces one of which is convex away from said vessel and the other of which is concave toward said vessel, h. axially spaced apart stationary block means supported from said stationary support means, one of said block means having a convexly curved surface interfacing with said concave surface and the other having a concavely curved surface interfacing with said convex surface, whereby to accept the axial thrust of said shaft means and permit radial rocking motion thereof.

9. In combination:

a. a metallurgical converter vessel, b. shaft means extending substantially coaxially and horizontally from opposite sides of said vessel, c. support means including first and second bearing means in which said shaft means are journaled, respectively, to enable rotation of said vessel to selected angular positions, said first and second bearing means also permitting axial movement of said shaft means, d. drive means for rotating said vessel and coupled to a first one of said shaft means, e. a thrust bearing means disposed generally axially along said shaft means independently of said first and second bearing means to absorb the forces transmitted primarily axially of said shaft means, said thrust bearing means comprising:

i. stationary support means disposed adjacent said shaft means and axially of said drive means, ii. a first element fixed on said shaft means and having a concavely curved first bearing surface the concavity of which is presented generally axially toward said vessel, iii. a second element mounted stationarily from said stationary support means and having a convex second surface complementary to said concave first surface of said first element and in interfacing sliding contact relation therewith, iv. bearing means having an inner race supported from said shaft means and an outer race,
v. a third element supported on said outer race and having a convex third surface the convexity of which is presented away from said vessel, and
vi. a fourth element mounted stationarily from said stationary support means and having a concave fourth surface complementary to and in interfacing sliding contact relationship with said third surface,
vii. said interfacing elements absorbing forces transmitted in either axial direction by said shaft means and permitting rotation and rocking of said shaft means.

10. The invention defined in claim 8 wherein:
a. said means rotatable with said one shaft means comprises at least two elements one of which has said convex surface and the other of which has said concave surface, and
b. bearing means interposed between said elements to permit one to rotate relative to the other.

* * * * *